US008977485B2

(12) United States Patent
Kessens et al.

(10) Patent No.: US 8,977,485 B2
(45) Date of Patent: Mar. 10, 2015

(54) METHODS FOR ROBOTIC SELF-RIGHTING

(71) Applicant: U.S. Army Research Laboratory, Adelphi, MD (US)

(72) Inventors: Chad C. Kessens, Abington, MD (US); Daniel C. Smith, Aberdeen, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 34 days.

(21) Appl. No.: 13/835,086

(22) Filed: Mar. 15, 2013

(65) Prior Publication Data

US 2014/0100768 A1    Apr. 10, 2014

Related U.S. Application Data

(60) Provisional application No. 61/670,866, filed on Jul. 12, 2012.

(51) Int. Cl.
   *G06F 17/10*    (2006.01)
   *B62D 55/04*   (2006.01)
   *G05D 3/00*    (2006.01)

(52) U.S. Cl.
   CPC .................................. *G05D 3/00* (2013.01)
   USPC ............................... 701/124; 180/9.3

(58) Field of Classification Search
   USPC ........................................ 701/124; 180/9.3
   See application file for complete search history.

(56) References Cited

U.S. PATENT DOCUMENTS 8,122,982 B2* 2/2012 Morey et al. ................. 180/9.32
8,369,991 B2* 2/2013 Goswami et al. ............ 700/253
8,616,308 B2* 12/2013 Morey et al. ................... 180/9.3
2008/0086241 A1* 4/2008 Phillips et al. ..................... 701/2
2009/0118864 A1* 5/2009 Eldridge et al. ............. 700/259
2012/0200149 A1* 8/2012 Rudakevych et al. ........ 305/109

OTHER PUBLICATIONS

C.B. Barber, D.P. Dobkin, and H. Huhdanpaa, "The QuickHull Algorithm for Convex Hulls," ACM Transactions on Mathematical Software (TOMS), New York, NY, USA, vol. 22, No. 4, 469-483, Dec. 1996.

B. Brown and G. Zeglin, "The Bow Leg Hopping Robot," Proceedings of the 1998 IEEE International Conference on Robotics and Automation, 1998.

(Continued)

*Primary Examiner* — Thomas G Black
*Assistant Examiner* — Tyler Paige
(74) *Attorney, Agent, or Firm* — Eric B. Compton

(57) ABSTRACT

Embodiments of the present invention are directed to methods of autonomously self-righting a maneuverable robot. In one embodiment, an autonomous method for self-righting a maneuverable robot to affect recovery from an overturned state to its nominal upright configuration may include: defining a convex hull and center of mass of each link of the robot; determining the convex hull and overall robot center of mass for each joint configuration of the robot; analyzing each convex hull face to determine its stability or instability; grouping continuously stable orientations of the robot and joint configurations together defining nodes and transitions there between; assigning a cost to transitions between nodes; computing an overall cost for each potential set of transition costs resulting in achievement of the goal; and determining a sequence of one or more actions to self-right the robot such that the sequence of actions minimizes the overall cost of self-righting the robot.

21 Claims, 12 Drawing Sheets

(56) References Cited

OTHER PUBLICATIONS

Edward Tunstel, "Evolution of Autonomous Self-Righting Behaviors for Articulated Nanorovers," in Proceedings of the 5th International Symposium on Artificial Intelligence, Robotics and Automation in Space, 1999.

P. Fiorini, et al., "A Hopping Robot for Planetary Exploration," 1999 IEEE Aerospace Conference Proceedings, vol. 2, 1999, 153-158.

E. Hale et al., "A Minimally Actuated Hopping Rover for Exploration of Celestial Bodies," IEEE International Conference on Robotics and Automation, 2000.

U. Saranli et al., "Model-Based Dynamic Self-Righting Maneuvers for a Hexapedal Robot," University of Pennsylvania ScholarlyCommons, Sep. 1, 2004, 903-918.

Z. Guanghua et al. "Realization of a Modular Reconfigurable Robot for Rough Terrain," Proceedings of the 2006 IEEE International Conference on Mechatronics and Automation, Jun. 25-28, 2006, Luoyang, China, 289-294.

M. I. Wallace et al., "Biologically Inspired Solutions for Compliant Limb UGVs," 2nd SEAS DTC Technical Conference—Edinburgh 2007.

A. Jusufi et al., "Active tails enhance arboreal acrobatics in geckos," PNAS, vol. 105, No. 11, Mar. 18, 2008, 4215-4219.

M. Davis et al., "A Review of Self-Righting Techniques for Terrestrial Animals," in proceeding of: International workshop on bio-inspired robots, Apr. 2011.

\* cited by examiner

|   | 1 | 2 | 3 | 4 | 5 | 6 | 7 | 8 |
|---|---|---|---|---|---|---|---|---|
| 1 | 0 | 33 | ∞ | ∞ | 0 | ∞ | ∞ | ∞ |
| 2 | ∞ | 0 | 35 | ∞ | ∞ | ∞ | ∞ | ∞ |
| 3 | ∞ | 1 | 0 | 99 | ∞ | ∞ | ∞ | ∞ |
| 4 | 99 | ∞ | 1 | 0 | 35 | ∞ | ∞ | ∞ |
| 5 | ∞ | ∞ | ∞ | 34 | 0 | ∞ | ∞ | ∞ |
| 6 | ∞ | ∞ | ∞ | 33 | 34 | 0 | ∞ | ∞ |
| 7 | ∞ | ∞ | 105 | ∞ | 455 | ∞ | 0 | ∞ |
| 8 | ∞ | ∞ | 86 | 239 | ∞ | ∞ | ∞ | 0 |

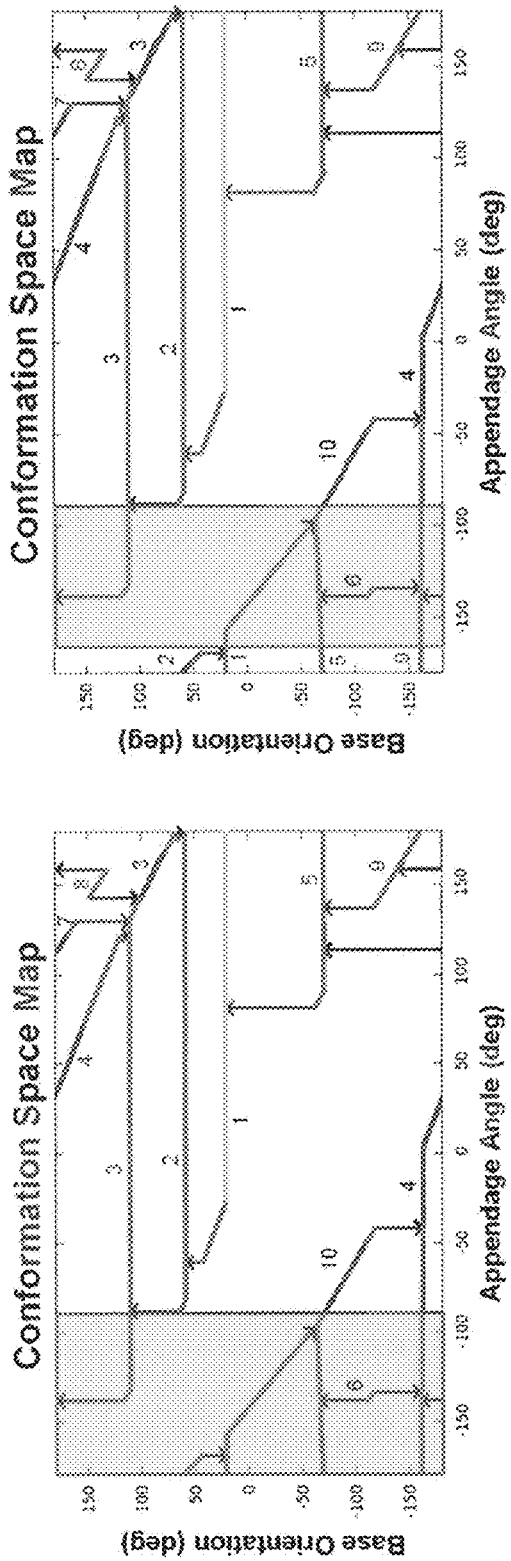
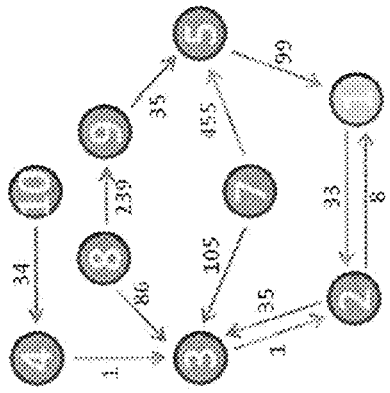
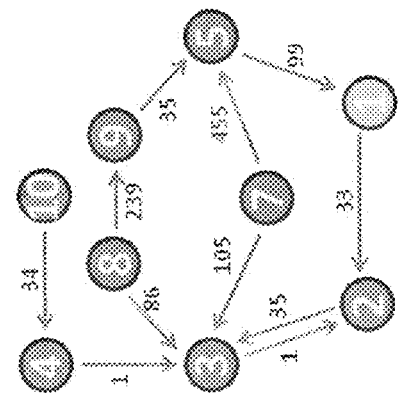
Figure 10B
Figure 10D
Figure 10A
Figure 10C

METHODS FOR ROBOTIC SELF-RIGHTING

CROSS REFERENCE TO RELATED APPLICATION(S)

This application claims the benefit of U.S. Provisional Patent Application No. 61/670,866 filed Jul. 12, 2012, herein incorporated by reference in its entirety.

GOVERNMENT INTEREST

The invention described herein may be manufactured, used and licensed by or for the U.S. Government without the payment of royalties thereon.

BACKGROUND OF THE INVENTION

1. Field

Embodiments of the present invention generally relate to maneuverability of robots, and in particular, to robots having self-righting capabilities.

2. Description of Related Art

Robots are increasingly being used for various applications including search and rescue operations, reconnaissance missions and combat situations. The use of robots in the field can improve combat effectiveness due to reduced mission completion times, increased mission success rates, and decreased casualty rates.

Unfortunately, during the performance of maneuvers, a robot may fall or tip over, preventing it from moving normally. Controlling the robot to successfully right itself can be a difficult and time-consuming task for operators, a major problem in situations that are already both time-sensitive and dangerous. For instance, those controlling the robot must determine how to re-orient the robot to a desired position, if it is even possible.

There have been several approaches employed, to-date, for robot self-righting, which can be categorized into four main groups: passive approaches, specific mechanisms, overturned drivability, and dynamic approaches. Passive approaches do not make an effort to actively self-right, relying on the shape of the robot and its center of mass location to allow for easy righting or to inhibit flipping. These approaches include geometries that possess some natural self-righting capability or preference for certain orientations, such as shaping the robot like a domed tortoise shell or an egg. By focusing on the geometry, little or no motion is needed to right the robot. Some robots rely on specific mechanisms for self-righting, such as a flipper. Another category of robots allow for upside-down operation, attempting to limit the need for self-righting. Other robots take a dynamic approach, focusing on the release of stored mechanical energy in an attempt to right the robot, such as by leveraging spring legs or generating rolling momentum.

Genetic and evolutionary algorithms for creating motion behaviors have also been proposed, which attempt to evaluate behaviors in physics simulations and simulate natural selection to achieve better control algorithms and minimize costs such as power consumed, the number of motions necessary, and the time elapsed in self-righting. It is not clear whether any of these has been actually implemented, and any solution achieved in this way is likely to be sub-optimal.

An improved robot self-righting methodology which could be applied to any generic robot would be useful.

BRIEF SUMMARY OF THE INVENTION

Embodiments of the present invention are directed to methods of autonomously self-righting a maneuverable robot.

In one embodiment, an autonomous method for self-righting a maneuverable robot to affect recovery from an overturned state to its nominal upright configuration may include: defining a convex hull and center of mass of each link of the robot; determining the convex hull and overall robot center of mass for each joint configuration of the robot; analyzing each convex hull face to determine its stability or instability; grouping continuously stable joint configuration/robot orientation combinations (henceforth referred to as conformations) together to define nodes and transitions there-between; assigning a cost to transitions between nodes; computing an overall cost for each potential set of transition costs resulting in achievement of the goal; and determining a sequence of one or more actions to self-right the robot such that the sequence of actions minimizes the overall costs of self-righting the robot.

In another embodiment, a robotic controller for self-righting a maneuverable robot to affect recovery from an overturned state to its nominal upright configuration may include: a processor configured to execute the above-described method.

In yet another embodiment, the above calculations may be performed prior to fielding the robot, creating a static map of the conformation space that can be stored using a computer-readable storage medium. The sensory data from the robot is then used to localize the current state on the map, and a path plan need only be generated to move from the current state to the nearest pre-computed optimal path to implement the above-described method.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. These embodiments are intended to be included within the following description and protected by the accompanying claims.

FIG. 2A shows the convex hull of the robot of FIG. 1. FIG. 2B shows orientations of the robot that align the faces of the convex hull with the ground. FIG. 2C shows that the center of mass location may be compared to a horizontal projection of the convex hull face which is extended vertically.

FIG. 4A shows the stable states divided into subnodes, which are continuously connected regions of existence and stability for a particular face. FIG. 4B shows the face corresponding to each subnode plot in FIG. 4A using asterisks.

FIGS. 10A-10D show the effect of introducing joint limits. FIG. 10A shows the conformation space map of the example robot illustrated in FIG. 1 for a ground angle of 20 degrees with joint limits at −90 and 180 (equivalent to −180) degrees. FIG. 10B shows the same figure with joint limits at −90 and 195 (equivalent to −165) degrees. FIGS. 10C and 10D show the corresponding directed graphs, with the goal node in green, nodes that can reach the goal in red, and nodes that cannot reach the goal in blue. Note that node 6 does not appear because the joint limits prevent any of its states from being reached.

DETAILED DESCRIPTION OF THE INVENTION

Embodiments of the present invention are directed to methods of autonomously self-righting a maneuverable robot. As used herein, "self-righting" may be defined as the act of maneuvering a robot to affect recovery from an overturned state to its nominal upright configuration. This may include determining a sequence of one or more actions that will ultimately enable the robot to regain its nominal orientation. The ability to autonomously self-right is important to robot operations in many service fields. Some robots include at least one articulated appendage (e.g., an arm, leg, flipper, or tail) which may be manipulated to self-right the robot. The articulated appendage may be composed of one or more links and joints which enable one link to move relative to another link.

A computational methodology may be executed to analyze various orientations of the robot and joint configurations to determine those which are stable and those which induce instability (i.e., tip-over) events in some embodiments. The results from this analysis may be organized into a graphical network model. This methodology allows robots to autonomously determine how to right themselves, to provide designers with a tool to assess whether their robots are able to self-right, and to determine the qualities that make robots more capable to self-right The self-righting methodology may require some basic information about the geometry and inertial properties of the robot. For example, a geometric model of the robot's mobility platform and appendage segments may be developed, including its joint locations, types, and limits. The model may also include the mass, center of mass location, and moments of inertia of the mobility platform at each appendage segment or link.

To maintain the generality of the methodology's framework, assumptions regarding the shape of the robot's base, the number of appendages, the number of degrees of freedom on each appendage, the type of joint (e.g. revolute or prismatic), or the shape of the appendage joints or links, for example, may be minimized or not considered. For example, in some embodiments, it may be assumed only that joints or links are rigid, and that the robot is capable of determining the ground angle and its joint positions.

Figure 1:
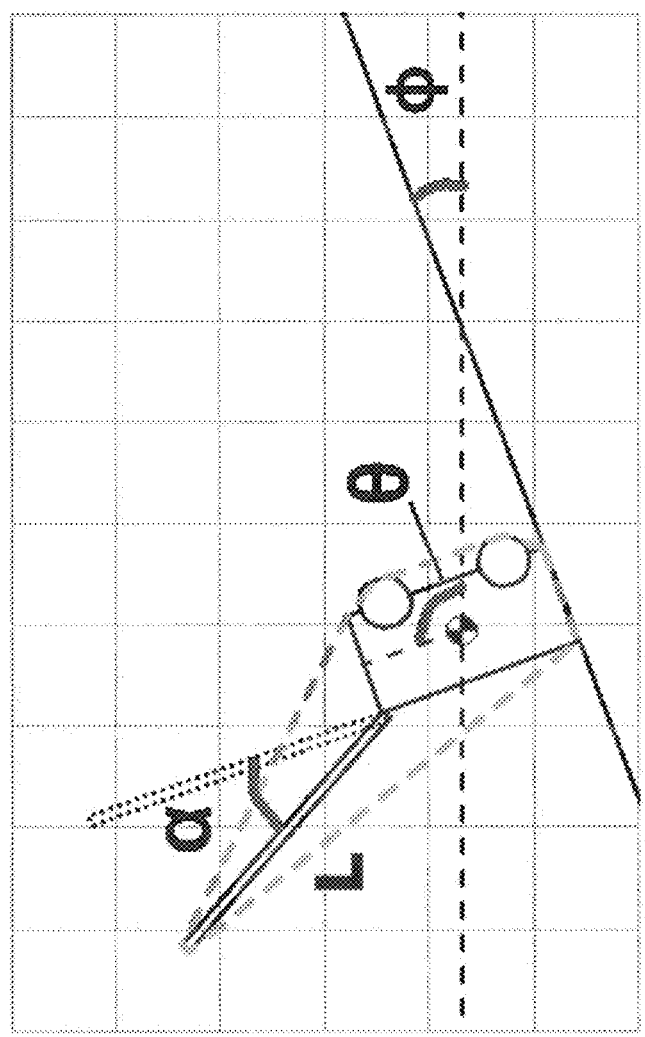
FIG. 1 shows a diagram of simple 2-dimensional robot model with a 1 degree of freedom arm on a non-level ground plane in accordance with embodiments of the present invention.

To illustrate each step in the methodology, FIG. 1 shows a diagram of a simple 2-dimensional robot model with a 1 degree of freedom arm on a non-level ground plane in accordance with embodiments of the present invention. This simplified model was selected to minimize the difficulties involved with visualizing high-dimensional energy and conformation spaces. While the examples described herein are given in two dimensions for the sake of illustration, it will be appreciated that the methodology may similarly be applied to three dimensions.

As used herein, the term "configuration" is used to denote a given set of joint angles of the robot, and the terms "conformation" and "state" are used interchangeably to denote a configuration and orientation set of the robot. Thus, several conformations may exist for a given robot configuration, some of which may be stable and others of which may be unstable. In addition, the term "orientation" is used to denote the robot's angular attitude with respect to gravity and the ground gradient.

The illustrated wheeled robot is shown resting on its back end in FIG. 1. Here, the base link of the robot is one unit tall by two units wide, and the arm is three units long and 0.09 units tall. The wheels have a diameter of 0.5 units, and are located 0.4 units from either end of the body. The center of mass is at the geometric center of the mobility platform. While some robots may have massive arms, in this example, the arm's mass may be considered negligible compared to the mass of the mobility platform. Also, while the example analysis provided herein assumes quasi-static conditions, it may be possible to include dynamic conditions such as dynamic rolling or dynamic appendage movements.

Some assumptions are made about the navigational abilities of the robot and its environment. In particular, the robot may be assumed to be able to determine its appendage angles and its orientation in space relative to the direction of gravity.

Many robots include an on-board inertial measurement unit (IMU) or similar device. Thus, one way to determine the ground angle may be by analyzing IMU data from the robot to obtain the direction of gravity. Knowing the position of the center of mass, the robot can determine which face of the convex hull is on the ground. Then, referring back to the IMU data, the robot can determine the ground's slope relative to gravity. As such, the human user may need only supply the following information: (i) the points defining the convex hull of each link; (ii) joint axis locations, types, and limits; and (iii) mass and center of mass location of each link. A geometric representation of the robot can then be rendered. If dynamic motions are included in the analysis, (iv) the moments of inertia of each link also need to be supplied.

Because interaction with the ground is inherent to the self-righting problem, information relating to the ground may be known in order to investigate and/or predict how the robot's actions will affect its orientation. While field conditions may sometimes necessitate operation on uneven or unstable ground, ground surfaces can often be approximated as rigid and planar. For the examples disclosed herein, a rigid planar surface has been used (although, it should be appreciated that other more complex surfaces including concave and convex geometries may be used to characterize the ground). This is important because it enables ground interaction to be defined solely in terms of the convex hull of the robot.

In general, $\phi$ will be used to represent the angle between the ground gradient and the horizontal. For the orientation illustrated in FIG. 1, the robot has arm angle $\alpha=30$ degrees, and global orientation $\theta=110$ degrees, where the ground angle $\phi=20$ degrees. While the methodology is valid for any ground angle, the examples described herein will use a ground angle of 20 degrees unless otherwise noted.

The term "convex hull" of an object, as used herein, may be defined as the minimal convex set containing all of the points defining the object. Put another way, the convex hull may be viewed as the smallest convex polyhedron (or polygon in 2 dimensions) that can fully encapsulate or envelope the geometry of the robot. Changes in any of the joint angles can result in the change of the geometry of the robot in space, and thus can cause a change in the geometry of the convex hull.

Figure 2B:
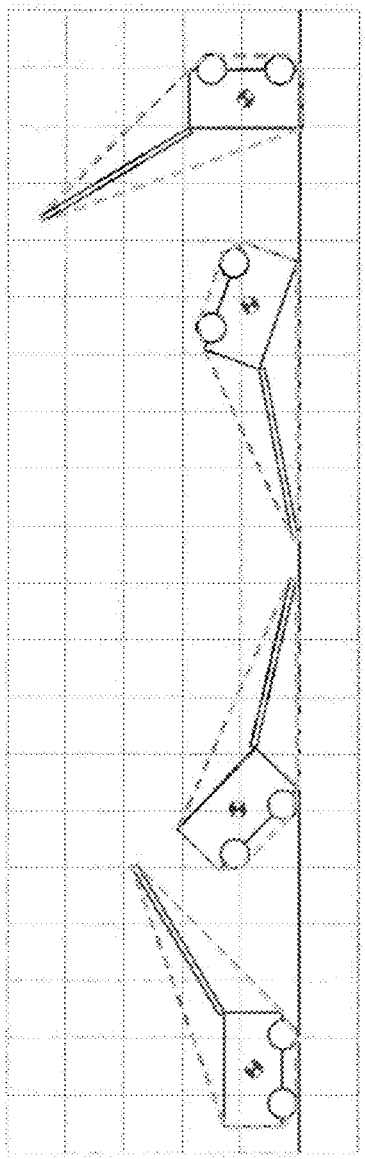
FIGS. 2A-2C illustrate aspects of the convex hull according to embodiments of the present invention.
Figure 2C:
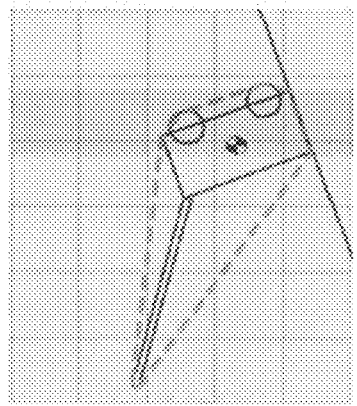
Figure 2A:
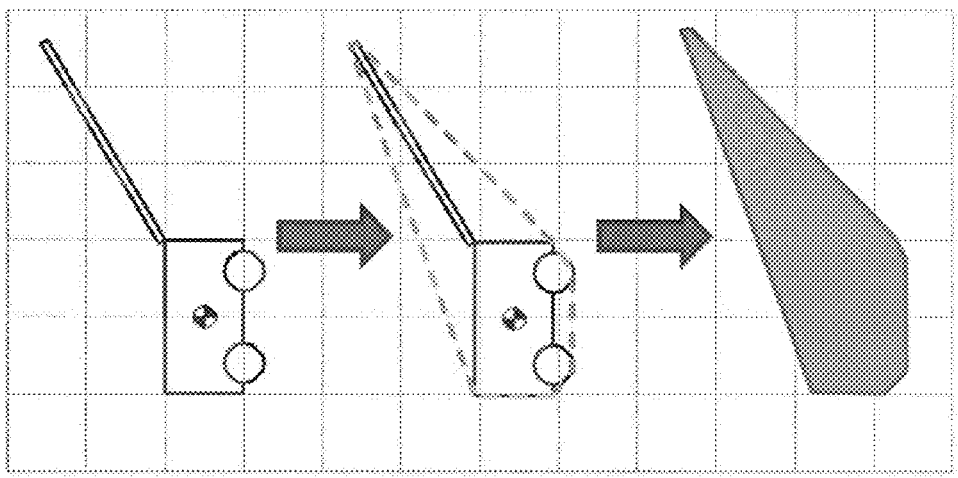

For a relatively simple 2-D model, the convex hull can be visualized as a taut rubber band surrounding an object. FIGS. 2A-2C show the convex hull of the example robot in several orientations. The convex hull of the robot in FIG. 2A is defined by the dotted line. Because an object must be supported by multiple ground contacts in order to be considered stable (at least 2 contacts in the 2D case; at least 3 contacts in the 3D case), a planar ground assumption therefore restricts consideration of stability to only orientations that align the faces of the convex hull with the ground. Any orientation that does not align a face of the convex hull with the ground may be considered inherently unstable. FIG. 2B shows the alignment of several faces of the robot's convex hull with the ground.

While facial alignment with the ground is a necessary, it is not a sufficient condition for stability. In addition, the center of mass location of the robot may be compared to a horizontal projection of the convex hull face which is extended vertically. This is illustrated in FIG. 2C. If the center of mass lies within this projection, then the orientation may be deemed stable, and the height of the center of mass is stored. If the center of mass lies on an edge of this projection, then the conformation is deemed at its tipping point. If it is outside of the projection, the orientation is deemed unstable.

Changing the joint angles may change the convex hull of the robot and/or the center of mass location, subject to the mass distribution among links. Therefore, the joint space may be discretized, forward kinematics applied to rotate each link appropriately, the new center of mass location computed, and the convex hull computed. One methodology which may used for computing the convex hull is the Quick-Hull algorithm described by C. B. Barber, D. P. Dobkin, and H. Huhdanpaa, "The QuickHull Algorithm for Convex Hulls," *ACM Transactions on Mathematical Software* (TOMS), New York, N.Y., USA, Vol. 22, No. 4, pp. 469-483, December 1996, herein incorporated by reference. The entire body may be "virtually" rotated such that one face of the convex hull is in contact with the ground. Here, "virtually" means computationally-determined or computed rather than an actual, physical step thereof.

One way to analyze the self-righting problem is by examining the potential energy profile (although others ways are possible). In some embodiments, the robot's stable orientations may be defined by the local minima of the potential energy function. Because the total mass and gravitational acceleration may be assumed constant in many cases, all of the relevant energy information is captured in the relative height of the center of mass, as described by Equation 1 as follows:

$$U = mgh - h \qquad (1)$$

Therefore, the height of the center of mass may be plotted against the independent variable $\alpha$ (arm angle) and the dependent variable $\theta$ (orientation).

Figure 3:
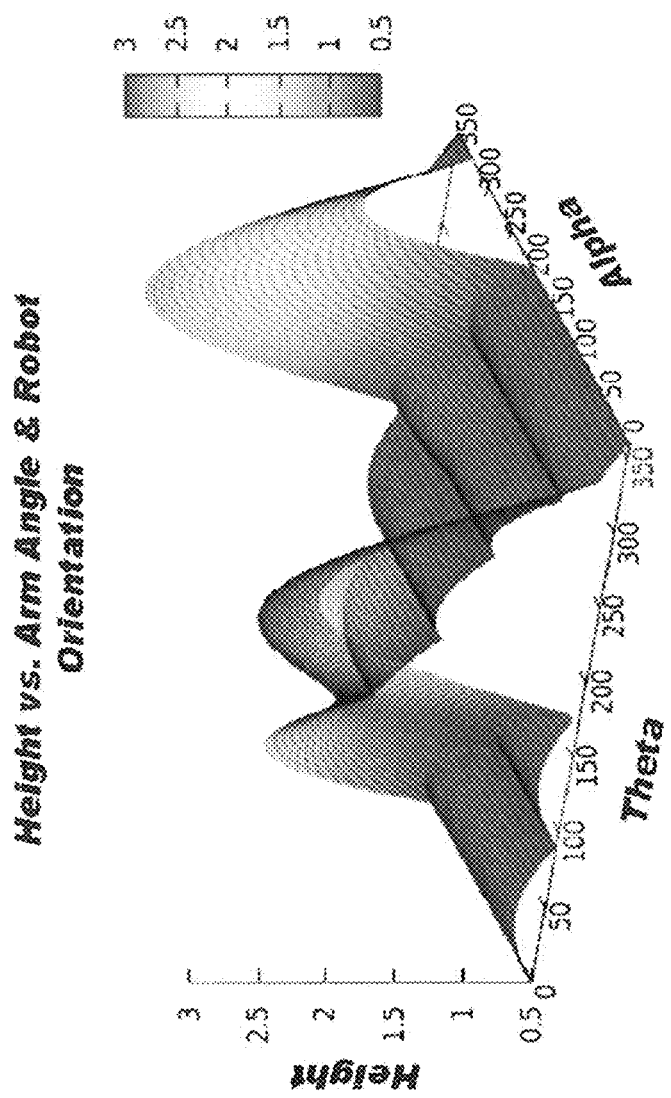
FIG. 3 shows the potential energy profile for the example robot shown in FIG. 1, plotted in 1 degree increments with respect to flat ground, i.e., a ground angle $\phi=0$.

FIG. 3 shows the potential energy profile for the example robot shown in FIG. 1, plotted in 1 degree increments with respect to level ground, i.e., ground angle $\phi=0$.

For a 3 dimensional robot with n joints, this plot would require n+4 dimensions (n joints +3 orientations +1 height). In FIG. 3, the plot is periodic for revolute joints, i.e. it wraps in the alpha $\alpha$ direction, and the plot wraps in the theta $\theta$ direction on level ground. For sloped ground, wrapping does not occur for orientation due to an additional change in potential energy as a result of rolling down the hill.

Because the example robot has well defined corners, the potential energy function is not continuously differentiable. This is evident from the cusps in the plot. The cusps arise because the rotational axis changes depending on if the robot is rolling right or left. Each rise and fall corresponds to rolling over one corner of the convex hull, with the largest rise and fall corresponding to the interaction of the arm with the ground. The stable orientations of the robot are defined by the valleys (bottoms of the cusps), as gravity seeks to minimize the potential energy. Since these values may be generally assumed to be constant, then the potential energy of the robot can be considered proportional to the height of the center of mass. Mathematically, this can be described by the following condition (for constant alpha a) as Equation 2:

$$\frac{\partial h}{\partial \theta}\bigg|_{\theta^-} \leq 0 \qquad (2)$$
and
$$\frac{\partial h}{\partial \theta}\bigg|_{\theta^+} \geq 0$$

Further examination of the potential energy profile shows that altering the arm angle $\alpha$ will cause the robot to move within a given valley. For certain values of alpha $\alpha$, where the arm interacts with the ground, the bottom of the valley rises. Once the conformation reaches a state where Equation (2) no longer holds, an unstable orientation exists, in which, the robot will topple down the energy profile to a new stable orientation. This event may be defined as a "transition."

While the potential energy profile provides an excellent way to visualize and understand the problem, generating the entire potential energy profile may be expensive computationally, in some instances. Therefore, alternative approaches to stability analysis may be implemented. For instance, based on the planar ground assumption, any points on the robot which could conceivably contact the ground will lie on the robot's convex hull.

Therefore, another way of determining if the orientation of the robot is stable may be to inspect the location of the center of mass relative to the projection of this side of the convex hull on the horizontal plane, as previously described. This geometric method may be preferable in some instances because it does not rely on expensive potential energy calculations for orientations that cannot even be stable. Ultimately, however, both methods yield the same results for stability and transition.

Figure 4B:
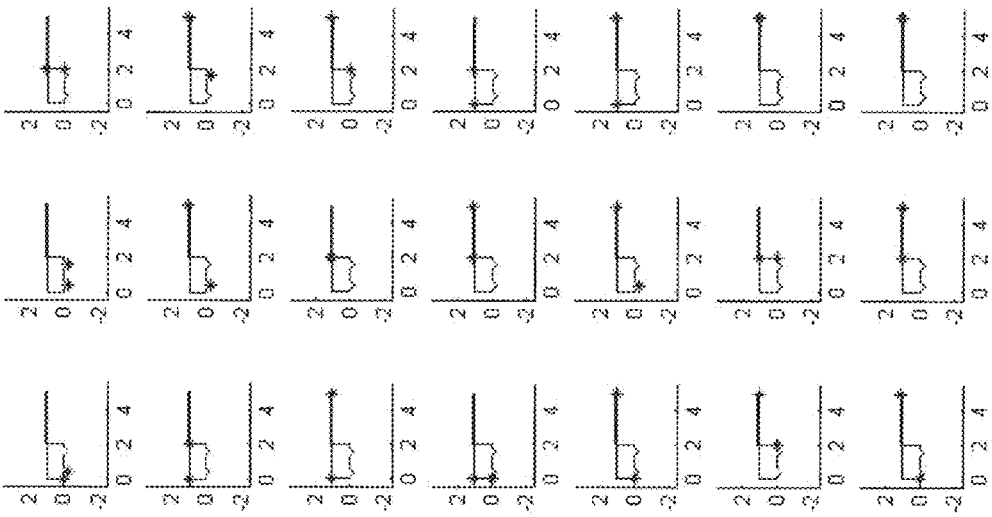
FIGS. 4A-4B show the stable states of the robot illustrated in FIG. 1 for a ground angle of 20 degrees.
Figure 4A:
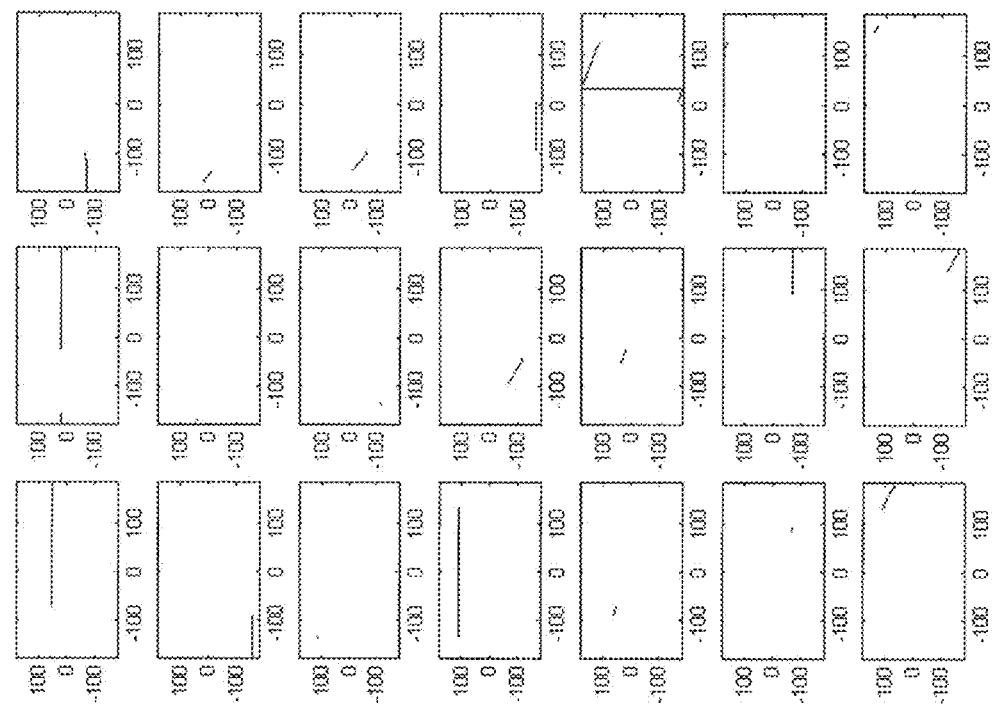

In accordance with the described geometric method of stability analysis, each face of the robot's convex hull for each arm angle was analyzed for stability. For all possible joint angle combinations, the location of each segment of the appendage may be determined using forward kinematics, for example. Changes in one of the joint angles can result in the change of the geometry of the robot in space, and thus can cause a change in the geometry of the convex hull. FIG. 4A shows the resulting stability plots of arm angle (horizontal axis) versus orientation (vertical axis) for each face. FIG. 4B shows the points on the robot for each face corresponding to the plots in FIG. 4A. Note that in some cases, a given face may exhibit multiple regions of stability that are not continuously connected (e.g. the 2 lowermost plots in the right column of FIGS. 4A and 4B). Each of these regions has been separated into its own class, which we denote as a subnode for reasons that will become apparent later.

These subnode plots may then be used to generate a conformation space map. This map shows all of the stable orientations that the robot can rest in for a given ground slope, subject to joint limits, as well as their connectivity. The map also shows how the robot can transition from one state to another by changing its joint values.

Figure 5:
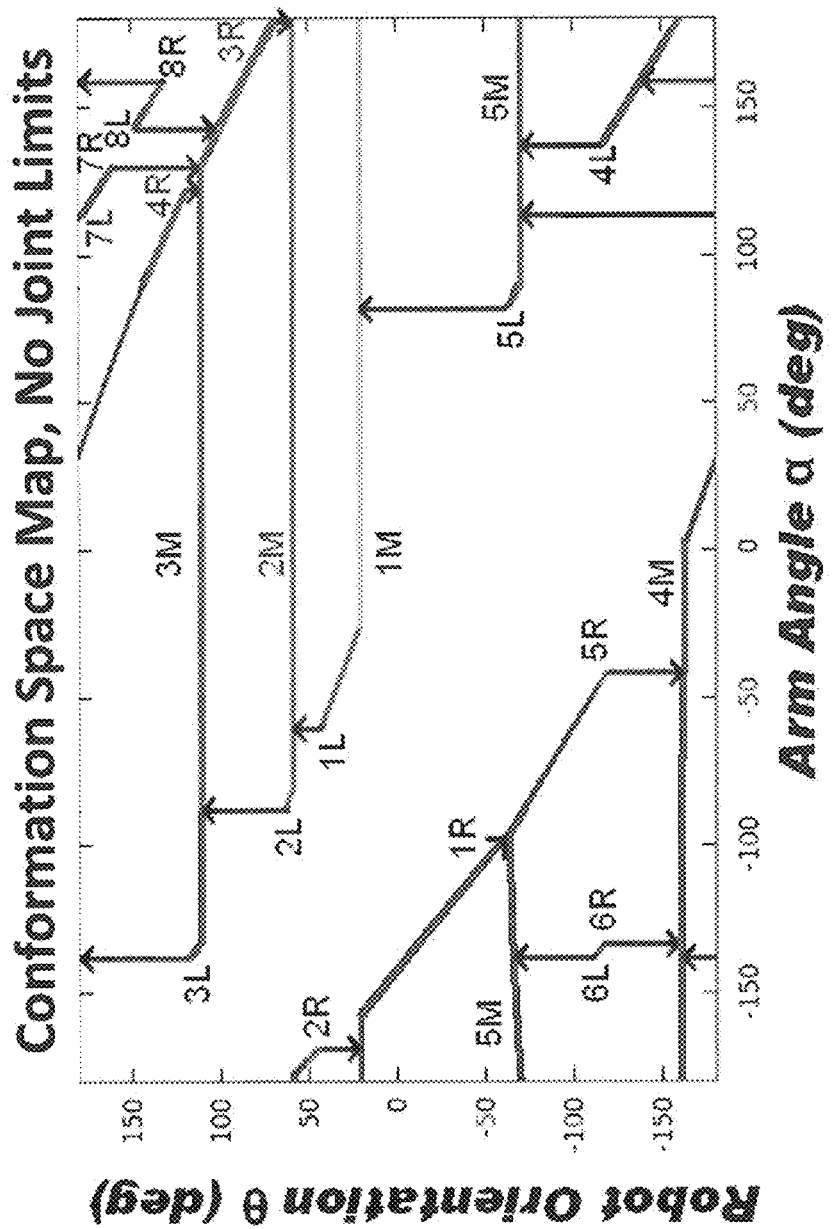
FIG. 5 shows the conformation space map for the robot illustrated in FIG. 1 for a ground angle of 20 degrees. This figure assumes the arm joint is without limits so that it can rotate continuously, enabling the diagram to wrap horizontally. The diagram also wraps vertically as the robot may roll continuously.

FIG. 5 shows the conformation space map for the robot illustrated in FIG. 1 for a ground angle of 20 degrees. It is noted that if this map were overlaid on top of its corresponding potential energy map, the lines of the conformation space map would exactly align with the local minima of the potential energy profile.

In this example, the robot's arm may be used to lift and reorient the robot. Actuating the arm to certain positions will cause the robot to lift itself and ultimately tip over. By moving through one or more orientations, the robot will ultimately reach its nominal goal orientation. Of course, other mechanisms may be employed by a robot to reorient itself, such as a leg, flipper, flap, tail, wing, antenna, multi-segmented body, or specially designed chassis shape.

The conformation space map may be divided into distinct regions, which are referred to as nodes, based upon the robot's ability to continuously reverse its previous action. Nodes are comprised of one or more subnodes, which are regions where a continuous path through joint space can be found for which the robot will continue to stably lie on the same face. A face is defined by a set of registered points on the robot. Nodes contain subnodes that are connected to one another via stable transitions from one face to another face. Such transitions often occur when a face disappears and another appears. Nodes have been assigned to all of the stable orientations for the robot as illustrated in FIG. 5. R and L indicate right and left edges of each node, respectively. M indicates a middle or intermediate conformation within the given node.

The light line for 1 M in FIG. 5 shows the goal orientation which the robot seeks to obtain to return to its nominal upright state, mid-grey lines represent achievable configurations. The numbers on each line label the node that they are a part of. For example, the goal orientation may be in node 1. Arrows in this graph are at points where the robot falls or tips; the potential energy of the robot here is at a local maxima. The red lines represent areas that the robot can travel between reversibly, solely by actuating the arm angle, alpha.

Figure 6:
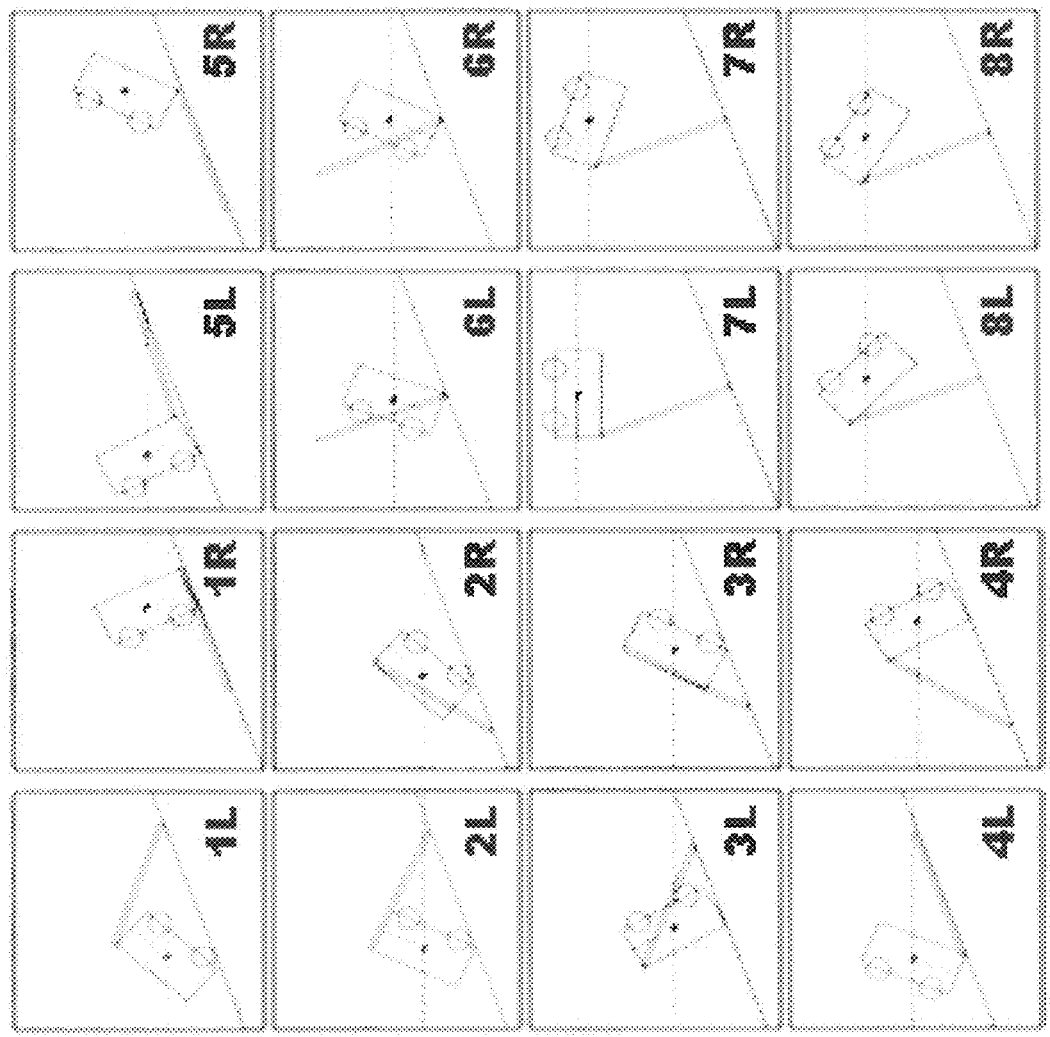
FIG. 6 illustrates select configurations and orientations of the robot illustrated in FIG. 1. Specifically, the illustrated conformations define the left and right edges of each node in FIG. 5.

FIG. 6 illustrates select conformations of the robot illustrated in FIG. 1. Specifically, these conformations represent the left and right edges of each node in FIG. 5. There may be many intermediate conformations therebetween which are not shown. Here, it is noted that nodes 6, 7, and 8—while technically might be considered stable due to finite arm thickness—would be likely impossible for the robot to achieve on its own, and highly improbable in the real world.

The conformation space map in FIG. 5 is easy to visualize; however, when the map increases to n+3 dimensions (n degrees of freedom +3 orientations), navigation can become more difficult. For example, by actuating its arm, the example robot can go from one position to the other. If at any point, it wanted to reverse the direction of the arm, it would regain its previous state so long as it remained on the same node. Nodes are bounded by transitions—conformations where a non-continuous state change occurs—such as when the robot reaches a tipping point and rolls down the potential energy curve. On the graph, this corresponds to a black arrow. After traversing an arrow, the robot cannot regain its previous state simply by reversing a joint motion. It may be possible to regain its previous state, but this would require traveling around a sort of hysteresis loop.

The example here exhibits a single transition point between given nodes, represented by a single vertical line. However, for the more general problem in higher dimensions, there may be many possibilities for transitioning between nodes. In such a case, it may be advantageous from a memory standpoint to store only the lowest transition cost between any two nodes, along with the conformations resulting in and from that transition, for instance.

Once nodes have been defined, one or more costs can be associated with the transitions between these nodes. There are several metrics that can be used for cost, including the time needed to travel through the node or along the edge or the energy dissipated from falling. In the latter case, the cost of the fall can be the difference in potential energy between the initial orientation and the orientation where the robot falls to. This is to avoid damaging the robot due to a long fall. To minimize memory requirements, if two nodes are connected by multiple transition points, only the lowest cost transition is stored.

In this example, the cost of transitioning from one node to another is assigned based on the change in height of the center of mass from one orientation to another, multiplied by 100 and rounded for the sake of visualization and to avoid fractional costs. Since all costs are multiplied by the same constant number, there is no adverse impact on any of the calculations used. Using this information, the robot's controller can determine the appropriate sequence of one or more movements or actions for self-righting. Thus, the best or most-optimal path through conformation space and the ideal motions needed for self-righting can be found. For example, if the robot is in state 6, then it could travel along the path to state 1, then 2, and finally to the goal orientation at state 3.

Because robots tend to have sensitive equipment on-board, such as sensors and computers (e.g., processors, controllers, etc.), the minimum change in potential energy may be chosen as a cost metric. Other cost metrics may include factors such as execution time, required energy, or a weighted combination of factors. Some metric schemes may require a different method of node assignment. Potential energy drops may be selected to minimize costs required for the robot to undergo the smallest jolts in transitioning to the goal state, exposing the robot components to the lowest risk movements. In addition, a cost analysis may assist robot designers considering shock absorbing mounts for their equipment by indicating appropriate design criteria.

Figures 7, 8:
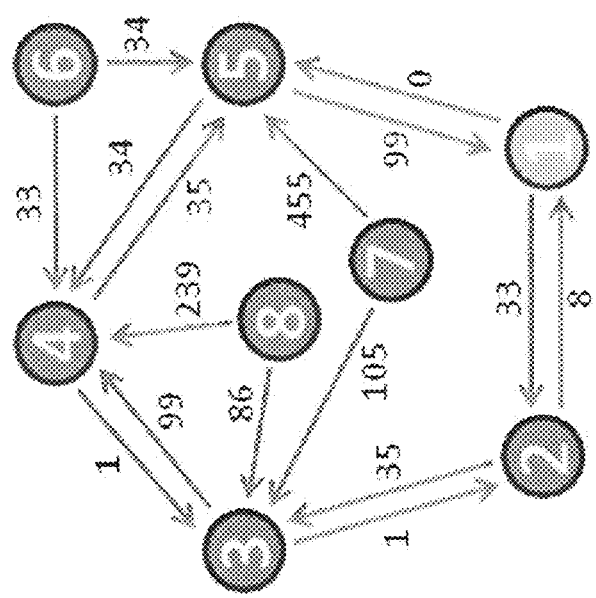
FIG. 7 shows a directed graph of all of the nodes based on the connectivity and costs of transitioning between nodes for the robot illustrated in FIG. 1.
FIG. 8 shows a cost matrix for the directed graph illustrated in FIG. 7.
Figure 9:
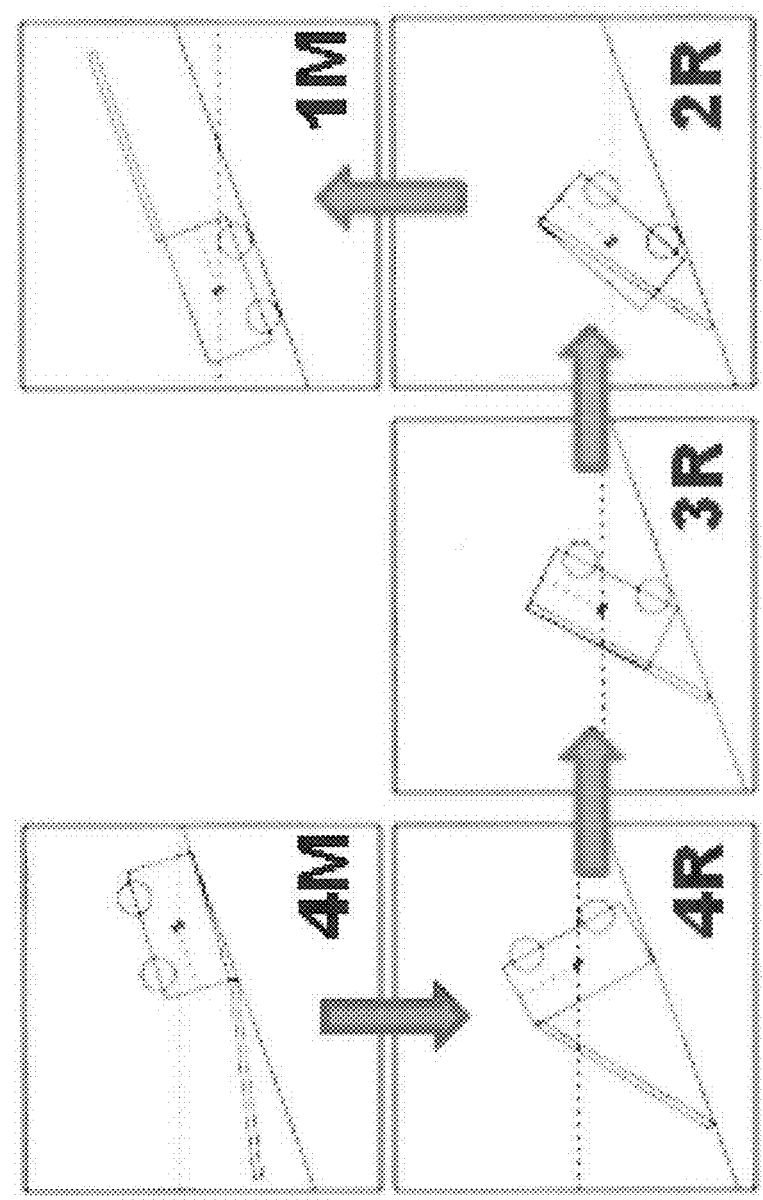
FIG. 9 shows a robot self-righting in accordance with embodiments of the present invention.

FIG. 7 shows a directed graph (digraph) of all of the nodes including the costs of transitioning between nodes for the robot illustrated in FIG. 1. Here, a directed graph (similar to a state diagram) is constructed from the orientation and potential energy data calculated. A single node in this directed graph represents a set of states that the robot can move among reversibly, where joint movements have a local one-to-one correspondence with the robot's orientation. Edges in the directed graph represent falls, only capable of being traversed in the direction of the fall.

Because of the high dimensionality of the problem, visualization of the potential energy profile and conformation space map becomes very challenging. However, because the framework segments the conformation space into nodes, graph theory allows the conformation space map to be represented as a digraph.

FIG. 8 shows a cost matrix for the directed graph illustrated in FIG. 7. The costs, once established, may be arranged into an m by m cost matrix, where m is the number of nodes. Each row of the matrix represents the costs of transitioning from a particular node. The columns of the matrix represent the costs of transitioning to a particular destination node. Here, because the cost metric does not consider factors regarding change of conformation within a given node, all diagonal elements are 0. If it is not possible to transition from a given node to another given node, the cost may be represented as infinite (max storable value). The cost matrix associated was multiplied by 100 for readability. The cost matrix is a simplified way of examining the directed graph shown. For example, the cost associated with going from node six to node four is 33. Although in this case each row has exactly 2 states (not including itself, on the diagonal) to which transition is possible, this will not generally be true for higher dimensions. It will also not generally be true if the dynamics of rolling are considered, as certain movements that result in transition may cause the robot to continuously tumble without regaining stability.

Once the directed graph has been created, start and goal orientations are applied to the directed graph. From this, there may be many approaches for determining the best route between them. One approach is to employ a shortest path algorithm, which would be a good method if execution time is a consideration. Another approach is to find the smallest maximum cost. Avoiding the highest costs may be ideal for an approach such as this one, where many short falls are preferred to one large, potentially damaging fall. If the algorithm is successful in finding a valid path, the robot should be able to reach the goal orientation. Other approaches are possible.

To generate an effective path through joint space in this example, the maximum change in potential energy between any 2 nodes along the chosen path is minimized. This is because many small shocks are preferable to one large shock. In one embodiment, a modified form of Dijkstra's algorithm to search the graph for an optimal solution. Other known techniques may also be used.

FIG. 8 shows a robot self-righting from an initial state within node 4. This involves movement traversing nodes 4, 3, 2, and finally to the goal in node 1, resulting in a maximum cost of 8. Alternatively, the robot could have self-righted by moving from node 4 to 5 to 1, but at a maximum cost of 99.

For some robots, certain joint configurations (e.g., angles) may not be possible or otherwise achievable in operation due to physical limitations on motion by the robots and/or their appendages. Such limitations, of course, will vary for different robots.

In addition to the above analysis which was performed assuming a joint capable of continuous rotation without limits, the analysis was also conducted for an arm with joint limits at −90 and +180 degrees and at −190 and +195 degrees. The respective corresponding conformation space maps are shown in FIGS. 10A and 10B. Conformations, for instance, in the shaded regions are ignored when determining the nodes and connectivity of the directed graphs shown in FIGS. 10C and 10D because they cannot be achieved if the joint limitation is imposed. Similar boundaries can be defined for other limitations on robotic motion. In addition, it may be desirable in some instances to avoid generating or computing the conformation space map in the unachievable regions altogether to save time and/or processing resources (as opposed to computing and then not using them).

An analysis of a digraph's reachability can be used to assess a given robot design's ability to self-right. Reachability refers to the ability to reach the goal node from other nodes. Such analysis can be very useful in evaluating a given robot's ability to self-right. For example, the joint limitations in FIG. 10C prevent nodes 10, 4, 3, and 2, illustrated in blue, from reaching the goal node 1 for a ground angle of 20 degrees. However, a slight relaxation of these joint limits results in FIG. 10D, where the goal is reachable from all nodes.

Figure 11:
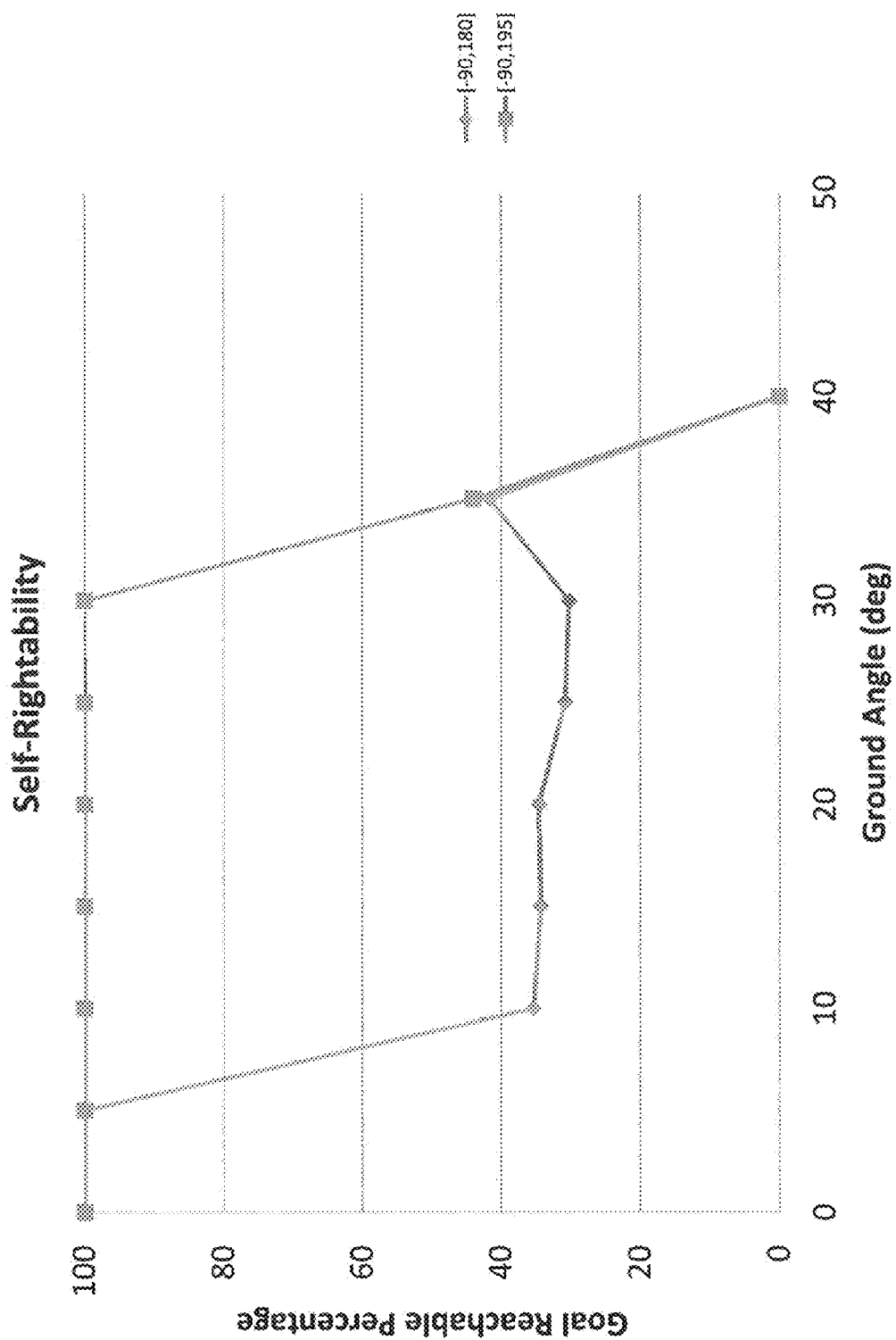
FIG. 11 shows the percentage of states for which the robot can right itself for varying ground angles given the joint limit scenarios shown in FIGS. 10A and 10B. Note that at a 40 degree ground angle, the goal orientation with the wheels on the ground is no longer stable, making the goal impossible to reach.

This shows one way in which embodiments may be extended to design analysis tools, enabling a designer to more efficiently determine the easiest ways to extend a given robot's self-rightability. Such design analysis tools may include performing a parametric study of several design factors. A self-rightability metric may be assigned based on the percentage of conformations that can reach the goal for a given ground angle. The metric may take into account this factor for many ground angles, as shown in FIG. 11 for the two example joint limit scenarios in FIGS. 10A and 10B. The planar and rigid ground assumptions may be relaxed, enabling robots to self-right and maneuver on very complex terrains including rubble piles where slip may become significant.

Figure 12B:
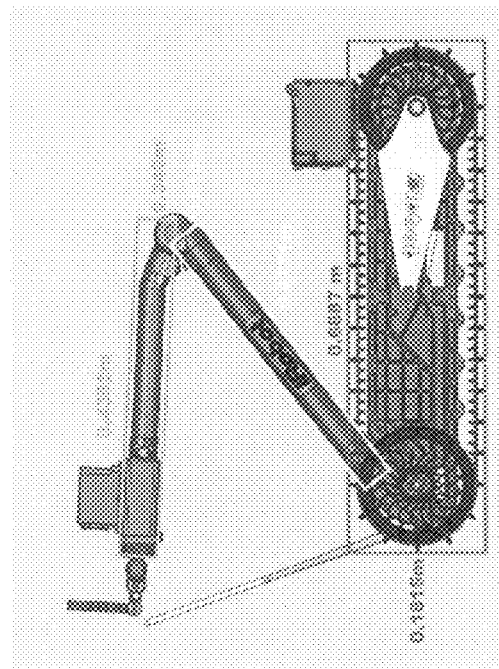
FIG. 12B shows a simplified model thereof, which was analyzed by the inventors in developing and evaluating self-righting methods according to embodiments of the present invention.
Figure 12A:
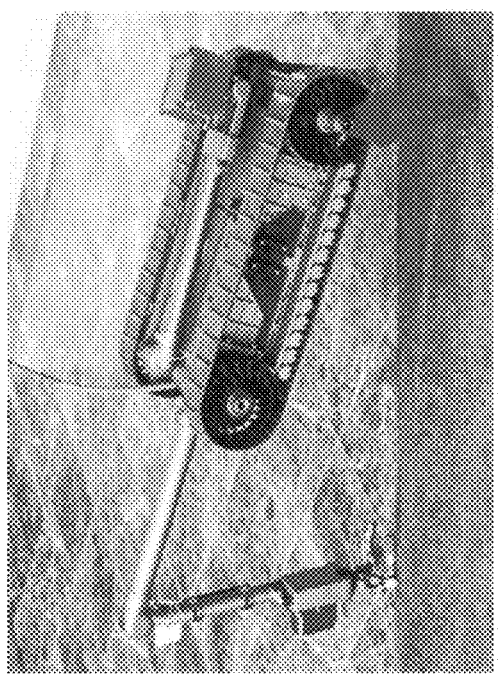
FIG. 12A shows a photograph of the iRobot® 510 Packbot®.

FIG. 12A shows a photograph of the iRobot® 510 Packbot®, and FIG. 12B shows a simplified model thereof, which was analyzed by the inventors in developing and evaluating self-righting methods according to embodiments of the present invention.

The iRobot® 510 Packbot® is one of the best-known fielded military robots. This robot is available in a variety of models. The model selected by the inventors links the two flippers together for stability and includes the Servo Actuation Manipulator (SAM) manipulator, which has 3 degrees of freedom configured as pitch-pitch-roll, in the center bay position. This particular robot did not include the sensor mast, and the roll joint in the wrist. Then, due to symmetry, the problem was formulated in 2-D.

FIG. 12B shows a simplified model of the iRobot® 510 Packbot®. The robot was simplified into three components, the body, the first arm segment, and the second arm segment. These components of the robot were analyzed using the above-described methodology. For some analysis, the robot's flippers were not taken into consideration, and the robot's arm was kept straight so as to be a 1 degree of freedom system. But, for other analysis, the flippers were included as a single entity (i.e. they moved together), and both arm joints were considered independent, a 3 degree of freedom system.

Using the methodology with a ground slope of 5 degrees, four nodes were identified with sufficient connectivity to enable self-righting from any initial conformation except lying on its side, which would be represented by 2 unconnected nodes (one for each side, not shown).

Figure 13:
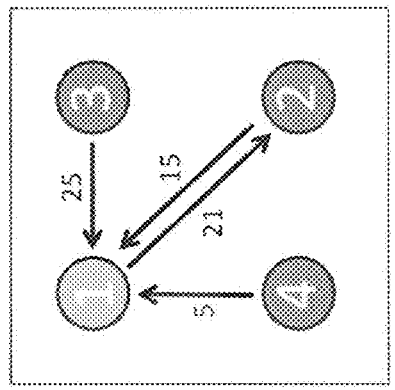
FIG. 13 shows a directed graph representing the conformation space map of the iRobot® 510 Packbot® in 2 dimensions.

FIG. 13 shows a directed graph representing the conformation space map of the iRobot® 510 Packbot®. The maximum cost of self-righting from any initial conformation requires that the center of mass fall 25 cm.

While the directed graphs shown in the examples above provide one potential means for navigating the conformation space, their usefulness remains limited to navigating from one node to another. For cases with more than one degree of freedom, such as the Packbot, path plans must also be generated within nodes. For the one degree of freedom case, such a path plan is trivial. However, additional degrees of freedom may open up a multitude of paths through joint space as nodes encompass surfaces, volumes, and even hyper-volumes of the conformations space. Further, in higher dimensions, nodes (and subnodes) may have holes that may need to be navigated around to prevent an undesired transition. This becomes evident if one considers a 2 degree of freedom arm whose total length is just sufficient to cause a transition. Thus, if the elbow is fully straightened and the shoulder moved appropriately, the robot will transition to a different node. However, a square path through joint space can be visualized passing around the hole but always staying on the same node by alternating movements of the elbow and shoulder, never moving the shoulder when the elbow is locked and never locking the elbow at the shoulder's critical angle.

Because nodes may be composed of subnodes as shown in FIG. 4A, one way to navigate this space could be to create a directed graph of the subnodes. Costs could be assigned based on the minimum stability margin at each transition. Other cost metrics may be used as well.

Finally, a path plan may be developed within each subnode. This path would take the robot from the current configuration to the desired transition state without leaving the subnode. The desired transition state may be determined using the formulations for determining paths from node to node and from subnode to subnode. Metrics for determining such a path through an individual subnode may include shortest path, battery usage, time, stability margin, or some other metric.

While the path planning routines may be developed for planar surfaces, it may also be able to apply this methodology to concave surfaces. In this case, the convex hull methodology still applies as only points on the convex hull can contact a concave surface. Such concave surfaces may include self-righting against a wall. However, navigation of concave surfaces may require a method of self-localization on the terrain, such as knowing the robot's distance from the wall.

Further, consideration of concave applications suggests that the methodology described herein may be applied to transitioning a robot from one surface to another, such as from the floor to climbing a wall or vice versa, by effectively choosing the appropriate goal conformation.

The methodology described herein may also not be limited to self-righting on non-convex surfaces. It is conceivable that a robot may be able to use a conformation space map generated for a planar surface to self-right on a convex surface. This could occur by developing a rough initial path plan and then relocalizing the robot on the map as movements of the appendages affect the orientation of the robot. In this way, the robot may be able to reform the map in real-time, using the planar map as a basis.

In some implementations, as shown in the examples above, the methodology may be implemented using a quasi-static computational approach. The quasi-static process ensures that the system will go through a sequence of states that are infinitesimally close to equilibrium (so the system remains in quasi-static equilibrium). For instance, a quasi-static robotic action may be assumed to have zero kinetic energy, i.e. inertial effects are negligible. It is noted that such analysis may be accurate for determining and evaluating stable states of the robot, but will not necessarily predict landing points accurately after a fall or tipping, as the kinetic energy during falling may carry the robot beyond the quasi-statically predicted landing point. In some scenarios, the robot may even build up enough kinetic energy to actually move (e.g., roll) through a stable node.

Thus, in some implementations, the methodology may include the dynamics of rolling in its analysis. This enables the prediction of situations where the robot may not be able to stop itself from continuing to roll after landing on a particular face or node, causing it to roll to the next face or node, further down the chain. One way to perform the analysis is by comparing the change in potential energy from the beginning of the first tip-over event to the quasi-statically predicted landing point against the potential energy needed to roll from the landing point to the next tipping point. To account for energy loss due to ground impact, the former value may be multiplied by a coefficient of restitution which moderates the impact according to the predicted energy transfer from the robot to the ground. The value of the coefficient of restitution may be constant or vary based on the type of ground surface and/or the joint configuration of the robot. Other implementations may also exist.

In addition, a quasi-static analysis may not predict a robot's full potential for self-righting because it neglects the potential to use momentum to overcome potential energy barriers to transition. Therefore, in some embodiments, dynamic analyses for joint motion may also be incorporated into the analysis. This may include factors such as accelerating or decelerating an appendage to generate enough momentum to overcome a potential energy barrier resulting from a joint limit, for example. Such a maneuver may also be used to generate counter momentum for "sticking" a landing that the robot may otherwise have rolled through, for instance. In addition, it may possible to include additional design factors, such as motor torque limits and frictional modeling.

Computation time and scalability remain issues to be addressed. Several factors should be considered. One concern lies in the geometric complexity of the robot. Because the framework relies upon a convex hull analysis, curved links are discretized, causing an increase in computation time as well as a possible decrease in accuracy. Real-world, multi-faceted links may also increase computation time, although this may be less significant than it might initially seem, as the convex hull algorithm will eliminate any concave features.

Moreover, it is important to note that computation time can scale exponentially with the number of joints. Therefore, when computation time is an issue, only major joints might be included in the analysis, in some instances. For example, when considering the human arm, one might fix the fingers and wrist joints in advantageous positions, and then neglect analysis of the affects of their motions.

Another way to improve run-time may be through intelligent sampling. In some embodiments, the entire conformation space map may not be generated to improve computational run-time. Rather than sample the configuration space at regular intervals, algorithms may be used to determine a reduced set of "seed" points at which sampling will yield enough data to generate an effective, if sub-optimal, map. Such algorithms may solve for critical points, inflection points, and/or zero points in the stability margin equation, or may solve for configurations where a face appears or disappears from the convex hull.

Another factor contributing to computation time lies in scaling up to three dimensions. If one were to use the potential energy method above, performing the analysis in three dimensions would require three orientation dimensions, each of which represents a continuous space, making the problem computationally intensive. Further, sampling the space would be inherently inaccurate as sampling could only approximate stable regions. Alternatively, in some implementations, the three continuous orientation dimensions may be reduced to a single discrete dimension and a single continuous dimension.

The discrete dimension S effectively captures latitude and longitude information that may change with joint configuration in a static way by tracking the continuously stable faces on which the robot may lie. This is an extension of the geometric method described above. Each face is defined by an ordered set of vertices registered by link and relative location, as in two dimensions. Because the same face may be stable for multiple orientations that are not continuously connected, we break those cases into different subnodes (S), each of which is continuously stable (see nodes 7 and 8 in the two dimensional example provided).

The continuous dimension captures the angular orientation (yaw) of the face relative to the gradient of the ground slope, which may be denoted by the variable $\psi$ (psi). The entire body may be virtually rotated about an axis normal to the ground plane, and the same stability analysis may be performed for each discrete step. This process may then be repeated for each face of the convex hull. Once a given joint configuration has been analyzed, a joint is discretely moved virtually, and the entire process is repeated until all possible joint configurations, and all resulting convex hull faces and yaw angles w have been analyzed.

Unfortunately, stable orientations (i.e. yaw motions of a face) may not be adequately captured if this continuous space is discretized, and this adds to computation time exponentially. While not disclosed above, one way to reduce computation time may be to analytically solve for the region of stability for varying ground slope, yaw angle, or joint angles rather than sampling discretely.

While computational time is an important concern, it is important to realize that the analysis need only be run once for a given robot, and it can be run off-line prior to fielding. Off-line analysis may even include development of general path plans such that the robot need only plan a path from its current location to the pre-generated path within its current subnode. In addition, the ability to compute off-line permits the use of parallel processing or even super-computers to generate conformation space maps and path plans.

Figure 14:
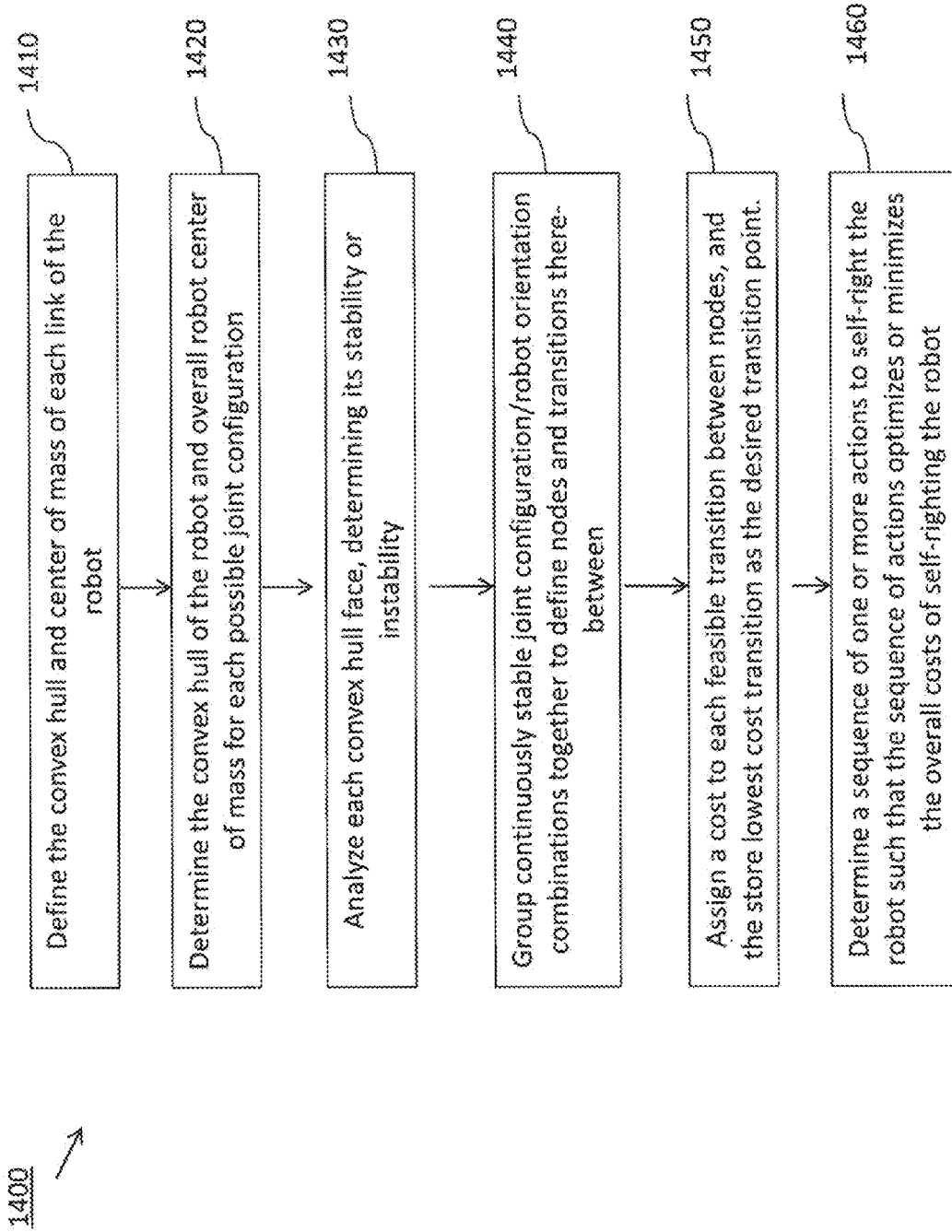
FIG. 14 shows an autonomous method for self-righting a maneuverable robot to affect recovery from an overturned state to its nominal upright configuration according to an embodiment of the present invention.

FIG. 14 shows an autonomous method 1400 for self-righting a maneuverable robot to affect recovery from an overturned state to its nominal upright configuration according to an embodiment of the present invention. In step 1410, the convex hull and center of mass of each link is defined. This may be performed by determining a minimal convex set of points defining the exterior of each link, wherein co-planar points of the convex set define convex hull faces of the object.

Next, in step 1420, for each possible joint configuration of the robot, the convex hull of the robot and overall robot center of mass are determined.

In step 1430, each convex hull face is analyzed to determine its stability or instability. For instance, the center of mass may be projected along the direction of gravity relative to the ground contact of each convex hull face, determining its stability or instability. Determining the robot's center of mass relative its ground contact may include analyzing inertial measurement unit (IMU) data from the robot to obtain the direction of gravity. In some instances, joint angle combinations are determined using forward kinematics.

While steps 1420 and 1430 are shown as being distinct processes in FIG. 14, it should be appreciated that steps 1420 and 1430 may be performed separately or concurrently in various embodiments. Splitting these steps may, however, require a great deal more in terms of memory and processing resources. Basically, this would require determining and storing the convex hull and center of mass in every possible joint configuration, and then iterating through all of that stored data to analyze stability of all the convex hull faces. On the other hand, concurrently performing these steps generally involves assessing the stability of each convex hull face while iterating through the joint configurations. As such, less memory and processing resources may be needed as compared to the former approach.

Once the stability analysis is performed, a conformation space map may be created showing all possible stable orientations and joint configurations for the robot.

In step 1440, continuously stable orientations of the robot and joint configurations are grouped together to define nodes and transitions there between. The grouping of continuously stable conformations of the robot together to define nodes and transitions may include dividing the conformation space map into nodal states based on continuity. And a directed graph may be further created based on the ability of the robot to transition from one node to another.

In step 1450, a cost is assigned to transition between nodes, and the lowest cost transition is stored as the desired transition point between nodes. The cost may include potential energy, execution time, required energy, or any weighted combination thereof. In one embodiment, assigning cost is based on the minimal change in potential energy between nodes. A cost matrix may be generated where rows of the matrix represent the costs of transitioning from a particular node and columns of the matrix represent the costs of transitioning to a particular destination node, for example. In some embodiments, only feasible transitions will be considered.

And, in step 1460, a sequence of one or more actions to self-right the robot is determined such that the sequence of actions optimizes or minimizes the overall costs of self-righting the robot. Following the method 1400, the sequence of one or more actions to self-right the robot may be executed by the robot.

In some embodiments, the methodology may be executed by the robot's on-board computer, controller and/or processors. The robot may be a newly-designed robot or a retrofitted field robot. Exemplary robots which may be configured to execute the method include, for instance, the iRobot® 510 Packbot®, Foster-Miller Talon, or Qinetiq DragonRunner.

For instance, the robot's on-board controller may include one or more microprocessors or programmable processor, such as, for example, a field-programmable gate array (FGPA) or an application-specific integrated circuit (ASIC) processor configured to execute control processing and to actuate motion of the robot for self-righting the robot. In some implementations, software code (instructions) may be stored on a computer or machine-readable storage media having computer- or machine-executable instructions executable by the microprocessor(s). A designated processor to execute an autonomous method for self-righting a maneuverable robot to affect recovery from an overturned state to its nominal upright configuration may be provided in some embodiments.

The executable-instructions may include software (firmware) created using any number of programming languages. Of course, it will be appreciated that any number of hardware implementations, combinations of hardware and software, programming languages, and operating platforms may be used. As such, the description or recitation of any specific hardware implementations, software, programming language, and/or operating platforms herein is exemplary only and should not be viewed as limiting.

Alternatively or additionally, the methodology may be executed as a stand-alone application running on a computer which interfaces with the remotely robot's control systems, for example, through a remote network connection, either through a wired or wireless connection. Other configurations may also be implemented.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. An autonomous method for self-righting a maneuverable robot to affect recovery from an overturned state to its nominal upright configuration, the method comprising:
   defining a convex hull and center of mass of each link of the robot;
   determining the convex hull and overall robot center of mass for each joint configuration of the robot;
   analyzing each convex hull face to determine its stability or instability;
   grouping continuously stable orientations of the robot and joint configurations together defining nodes and transitions there between;
   assigning a cost to transitions between nodes;
   computing an overall cost for each potential set of transition costs resulting in achievement of the goal; and
   determining a sequence of one or more actions to self-right the robot such that the sequence of actions minimizes the overall cost of self-righting the robot.

2. The method of claim 1, wherein defining the convex hull comprises:
   determining a minimal convex set of points defining the exterior of the robot, wherein co-planar points of the convex set define convex hull faces of the robot.

3. The method of claim 1, further comprising: creating a conformation space map including all possible stable orientations and joint configurations for the robot.

4. The method of claim 3, further comprising: grouping continuously stable conformations of the robot together; and dividing the conformation space map into nodal states based on continuity.

5. The method of claim 3, further comprising: defining boundaries on the conformation space map which correspond to limitations of motion of the robot, and determining the directed graph based only on the achievable portions of the conformation space map.

6. The method of claim 1, further comprising: creating a directed graph based on the ability of the robot to transition from one node to another.

7. The method of claim 1, wherein assigning a cost to transitions between nodes comprises: assigning a cost to only feasible transitions between nodes.

8. The method of claim 1, further comprising: creating a cost matrix where rows of the matrix represent the costs of transitioning from a particular node and columns of the matrix represent the costs of transitioning to a particular destination node.

9. The method of claim 1, wherein the cost comprises potential energy, execution time, required energy, or any weighted combination thereof.

10. The method of claim 9, wherein assigning cost is based on the minimal change in potential energy between nodes.

11. The method of claim 1, wherein analyzing the stability for each convex hull face comprises: determining the center of mass of the robot with respect to the direction of gravity relative to the ground contact of each convex hull face.

12. The method of claim 11, wherein determining the robot's orientation comprises analyzing inertial measurement unit (IMU) data from the robot to obtain the direction of gravity.

13. The method of claim 1, further comprising: maintaining the lowest cost transition as a desired transition point between nodes.

14. The method of claim 1, wherein determining the sequence of one or more actions to self-right the robot comprises: quantifying rightability based on percentage of states within reach of the goal state.

15. The method of claim 1, wherein link positions are determined using forward kinematics.

16. The method of claim 1, further comprising: executing the sequence of one or more actions to self-right the robot.

17. The method of claim 1, wherein the steps of determining the convex hull and overall robot center of mass for each joint configuration of the robot and analyzing each convex hull face to determine its stability or instability are performed separately by:
   determining the convex hull and center of mass for every possible joint configuration; and
   subsequently analyzing stability of all the convex hull faces using said determinations.

18. The method of claim 1, wherein the steps of determining the convex hull and overall robot center of mass for each joint configuration of the robot and analyzing each convex hull face to determine its stability or instability are performed concurrently by:
   analyzing the stability of each convex hull face while iteratively determining joint configurations.

19. The method of claim 1, wherein determining a sequence of one or more actions to self-right the robot such that the sequence of actions optimizes or minimizes the overall costs of self-righting the robot comprises: minimizing the total cost in the route through employing a shortest path algorithm, and/or avoiding the edges with the largest costs entirely.

20. A robotic controller comprising: a processor programmed with instructions to execute the method of claim 1.

21. A non-transitory computer-readable storage medium having computer-readable instructions, that when executed by a processor, implement the method of claim 1.

* * * * *